United States Patent
Schulz et al.

(10) Patent No.: US 8,776,307 B2
(45) Date of Patent: Jul. 15, 2014

(54) AIR VOLUME FLOW AND PUSHING FORCE CONTROL DEVICE

(75) Inventors: Detlef Schulz, Altenriet (DE); Thomas Strehler, Bad Neustadt (DE); Rudolf Hermann, Sülzfeld (DE); Roland Illig, Heustreu (DE); Peter Lehmann, Meiningen (DE); Silvio Hamm, Sülzfeld (DE)

(73) Assignee: Gerhard Kurz, Althengstett (DE)

( * ) Notice: Subject to any disclaimer, the term of this patent is extended or adjusted under 35 U.S.C. 154(b) by 273 days.

(21) Appl. No.: 12/789,998

(22) Filed: May 28, 2010

(65) Prior Publication Data

US 2010/0300489 A1    Dec. 2, 2010

Related U.S. Application Data

(63) Continuation of application No. PCT/EP2008/010115, filed on Nov. 28, 2008.

(30) Foreign Application Priority Data

Nov. 28, 2007 (DE) .......................... 10 2007 057 589

(51) Int. Cl.
*A47L 9/00* (2006.01)
(52) U.S. Cl.
USPC .......................................................... 15/339
(58) Field of Classification Search
USPC .................. 15/300.1, 319, 339, 346, 412
See application file for complete search history.

(56) References Cited

U.S. PATENT DOCUMENTS

| 5,881,430 A | * | 3/1999 | Driessen et al. | 15/319 |
| 6,105,202 A | * | 8/2000 | Grasso et al. | 15/319 |

FOREIGN PATENT DOCUMENTS

| CN | 1164825 A | 11/1997 | | |
| DE | 28 19 193 | 11/1979 | | |
| DE | 30 30 059 C2 | 8/1984 | | |
| DE | 89 05 463.6 | 11/1989 | | |
| DE | 92 17 416.7 | 5/1993 | | |
| DE | 10 2004 014 252 A1 | 6/2005 | | |
| EP | 0 458 057 A1 | 11/1991 | | |
| EP | 458057 A1 | * | 11/1991 | ............... A47L 9/28 |
| EP | 0 636 341 A1 | 2/1995 | | |
| JP | 63-65835 | 3/1988 | | |
| JP | 4-231924 | 8/1992 | | |
| JP | 7-143945 | 6/1995 | | |
| JP | 10-201689 | 8/1998 | | |
| JP | 2002-28117 | 1/2002 | | |
| JP | 2004-97942 | 4/2004 | | |
| JP | 2007-512884 | 5/2007 | | |
| WO | WO 02/091899 A1 | 11/2002 | | |
| WO | 2005/087074 A1 | 9/2005 | | |

* cited by examiner

Primary Examiner — Robert Scruggs
(74) Attorney, Agent, or Firm — Harness, Dickey & Pierce, P.L.C.

(57) ABSTRACT

The invention relates to an air volume flow and pushing force control device for a vacuum cleaner that has at least a motor, a dust receptacle and a suction nozzle, comprising a controller for controlling the motor power, a first sensor for detecting the air volume flow, which in conjunction with the controller forms a first control loop in order to maintain the air volume flow at a prescribed air volume flow value on the basis of the signal of the first sensor. The control device further comprises a second sensor for detecting a pushing force that is required for pushing the suction nozzle, and in conjunction with the controller, forms a second control loop in order to maintain the pushing force below a prescribed value on the basis of the signal of the second sensor, and a control loop selection device that activates one of the two control loops as a function of the signals of the two sensors.

6 Claims, 1 Drawing Sheet

AIR VOLUME FLOW AND PUSHING FORCE CONTROL DEVICE

CROSS-REFERENCES TO RELATED APPLICATIONS

This application is a continuation of copending international patent application PCT/EP2008/010115 filed on Nov. 28, 2008 and designating the U.S., which claims priority of German patent application DE 10 2007 057 589.2 filed on Nov. 28, 2007. The entire contents of these applications are incorporated herein by reference.

BACKGROUND OF THE INVENTION

The present invention relates to an air volume flow and pushing force control device for a vacuum cleaner that has at least a motor, a dust receptacle and a suction nozzle, comprising a controller for controlling the motor power, and a first sensor, for detecting the air volume flow, which in conjunction with the controller forms a first control loop in order to maintain the air volume flow at a prescribed air volume flow value on the basis of the signal of the first sensor.

Air volume flow control devices for vacuum cleaners are generally known. They are used for the purpose of maintaining the air volume flow constant at a prescribed value, independently of the filling level of a dust bag present in the vacuum cleaner. Without such a control, with an empty dust bag the air volume flow would be very high because of the low resistance, whereas it would be correspondingly low with a filled dust bag. This would lead to different suction results, something which is not desired. Moreover, the air volume flow control is advantageous from the point of view of energy, since it is possible to operate at a lower motor power with an empty dust bag.

The air volume flow can be detected, for example, by measuring the pressure between the dust bag receptacle and the motor. Since the pressure bears a fixed relationship to the air volume flow, the air volume flow can be inferred via this measurement. If this pressure varies, the control proceeds on the assumption that the dust bag has been filled, and in reaction thereto the motor power of the motor is raised in order to keep the air volume flow constant.

The air volume flow control of the abovenamed type also responds when the air volume flow is reduced not by the filling of the dust bag, but, for example, by virtue of the fact that the suction nozzle has been brought onto a soft underlying surface, for example a soft dense carpet. In this case, as well, the control attempts to keep the air volume flow constant and therefore raises the motor power. However, the consequence of this is that the force required to move the suction nozzle, which is referred to below as pushing force, increases, and therefore hampers the use of the vacuum cleaner.

SUMMARY OF THE INVENTION

Against this background, the object of the present invention consists in developing the air volume flow control device mentioned at the beginning such that it is no longer affected by the disadvantages mentioned.

This object is achieved by providing a second sensor for detecting a pushing force that is required to push the suction nozzle and, in conjunction with the controller, forms a second control loop, and by providing a control loop selection device that activates one of the two control loops as a function of the signals of the two sensors.

This means, in other words, that the inventive control device has two control loops, specifically one for the air volume flow and one for the pushing force. However, the two control loops are not simultaneously active. Rather, the control loop selection device selects one of the two control loops for controlling the motor power, specifically as a function of which particular values the two sensors supply. If, in a preferred embodiment of the invention, the second sensor signals a pushing force that is greater than a prescribed value, for example, the control loop selection device switches from the first control loop, which executes air volume flow control, to the second control loop, which executes pushing force control. This control loop remains active until the control loop selection device receives a signal from the second sensor that the pushing force has undershot the prescribed maximum value again.

The inventive air volume flow and pushing force control device consequently provides a control loop selection device that activates one of the two control loops as a function of defined rules which are stored in this selection device.

In a preferred embodiment, the first sensor is a pressure sensor, preferably an analog pressure sensor.

This measure has proved to be advantageous from the aspect of economics. Analog pressure sensors are cost-effective and very reliable. Since there is a fixed relationship between the measured pressure and the flow rate, the air volume flow can be inferred from the measured pressure.

Of course, it is also conceivable to provide the first sensor as sensor measurement of the flow rate.

In a preferred embodiment, the second sensor is a pressure sensor that detects the negative pressure present in the region of the suction nozzle.

This pressure sensor can likewise be provided as an analog pressure sensor. Since the force required to push the suction nozzle over the floor bears a direct relationship to the negative pressure prevailing in the region of the suction nozzle, it is advantageously possible to infer the pushing force via the measured negative pressure.

Of course, instead of using the pressure sensor it would also be conceivable to use a force measuring sensor, for example in the form of strain gauges, in order thereby to measure the pushing force directly.

In a preferred development, the pressure sensor is designed as a pressure switch that outputs a signal upon overshooting of a prescribed negative pressure.

This measure has proved to be particularly cost-effective, since the pressure sensor need display only the overshooting of a prescribed negative pressure, but need not display an absolute value.

The object on which the invention is based is also solved by a method for controlling the air volume flow of a vacuum cleaner that has the following steps:

detecting the air volume flow between dust receptacle and motor;

detecting the pushing force required to push the suction nozzle, and controlling the power of the motor in such a way that the pushing force lies below a prescribed value as long as the detected pushing force is greater than a prescribed value, and otherwise controlling the power of the motor in such a way that a prescribed air volume flow value is maintained.

This means, in other words, that the inventive method provides for two control loops, specifically on the one hand a control loop for controlling the air volume flow and, on the other hand, a control loop for controlling the pushing force. The control of the air volume flow to a prescribed value is performed whenever the pushing force does not overshoot a likewise prescribed maximum value. However, as soon as this maximum value is overshot, the other control loop is activated and is controlled such that the pushing force is brought below the prescribed maximum pushing force value. As soon as the detected pushing force lies once again below the maximum pushing force value, a return is made to the control of the air volume flow.

The advantage of this inventive method resides, inter alia, in that the use of the vacuum cleaner is further improved. On the other hand, it is ensured that the suction power remains constant even with a dust bag that is being filled and, on the other hand, the pushing force is positively influenced whenever it overshoots a prescribed value, and so the user never need expend an excessively high force to push the suction nozzle.

In a preferred development of the method, the pressure between dust receptacle and motor is detected in order to infer the air volume flow via said pressure.

By comparison with detecting the flow rate, it is possible to detect the pressure more easily and more cost-effectively.

In a preferred development of the method, the pushing force is determined by detecting the negative pressure of the suction nozzle.

In practice, this measure also leads to cost savings, since the determination of the pushing force via strain gauges, which would also be a possible alternative, is associated with higher costs.

The object on which the invention is based is also achieved by a floor vacuum cleaner that includes an inventive control device.

Further advantages and refinements of the invention follow from the description and the attached drawing.

It goes without saying that what has previously been mentioned and the features still to be explained below can be used not only in the respectively specified combination, but also in other combinations or on their own without departing from the framework of the present invention.

BRIEF DESCRIPTION OF THE DRAWINGS

The invention will now be explained below in greater detail with reference to an exemplary embodiment and with the aid of figures, in which.

DETAILED DESCRIPTION OF PREFERRED EMBODIMENTS

Figure 1:
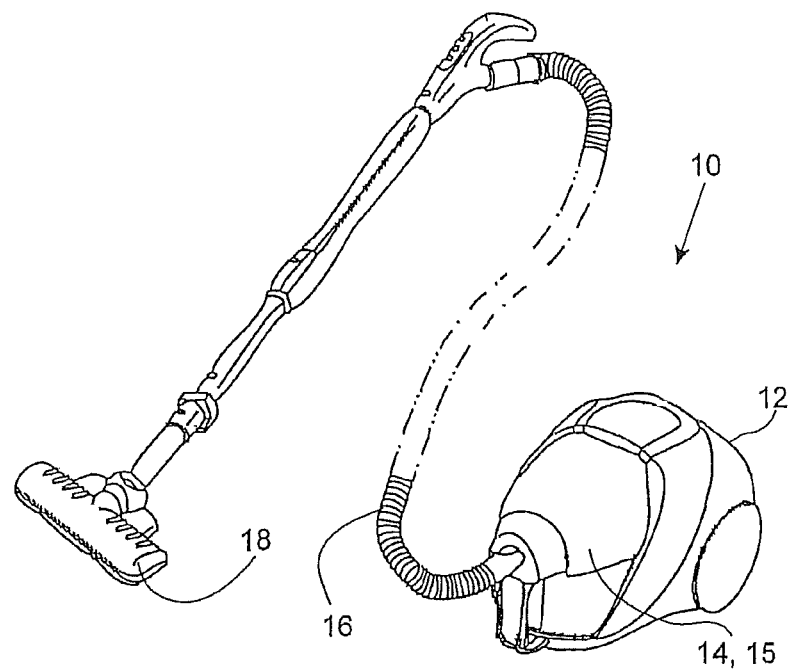
FIG. 1 is a schematic of a vacuum cleaner.

A vacuum cleaner, in particular a floor vacuum cleaner, is illustrated schematically in FIG. 1 and marked with the reference numeral 10. The floor vacuum cleaner 10 has a housing 12 that, in addition to a motor (not to be seen) also accommodates a dust bag receptacle 14 with a dust bag 15. Also included in the housing 12 is the electronics required to control the motor.

A hose and/or tube 16 passes from the vacuum cleaner housing 12 to a floor suction nozzle 18 that is pushed over a floor in order to clean the latter. Since the general design of such a floor vacuum cleaner is generally known, it will not be considered in further detail.

The air sucked in by the motor passes during suction via the floor suction nozzle 18 and the hose 16 into the dust bag 15, which filters out the dust particles, then passes the motor and once again reaches the outside from the vacuum cleaner housing 12. In order to keep the suction result constant, it is necessary to equalize the flow resistance, which is caused by the dust bag and is always changing. Specifically, the air volume flow between dust bag and motor should be constant for a good suction result.

In order to keep the air volume flow constant in this way, the floor vacuum cleaner 10 comprises a first control loop that has a first sensor for detecting the air volume flow between dust bag receptacle 14 and motor, and controls the power of the motor as a function thereof.

If the floor suction nozzle 18 is pushed from a hard floor onto a soft carpet floor in conjunction with effective air volume flow control, the air throughflow from outside into the floor suction nozzle 18, and thus to the dust bag is substantially reduced, the result of this being that the air volume flow control increases the power of the motor on the basis of the reduced volume flow in order once again to reach the constant prescribed volume flow.

However, this leads to the situation in which the floor suction nozzle is sucked yet more strongly against the floor, and so the force required to push the floor suction nozzle rises further, thereby greatly hampering use.

In order to overcome this advantage of the air volume flow control, a second control loop is provided and this detects the pushing force via a sensor and controls the motor power such that this pushing force does not overshoot a prescribed value.

The two control loops are now connected to each other such that the second control loop, which influences the pushing force, always comes into use whenever the pushing force overshoots a predetermined value. The first control loop is then deactivated. The control of the pushing force via the second control loop takes place until the prescribed value is undershot. The first control loop is then activated again and the second control loop is deactivated.

The two control loops provided are thus used in accordance with predetermined criteria or rules, only one of the two control loops ever being active, while the other control loop is inactive. The selection of the control loop to be activated takes place in this case in the exemplary embodiment described on the basis of the detected pushing force. The overshooting of a prescribed pushing force leads to the activation of the second control loop, whereas otherwise the first control loop is active.

Figure 2:
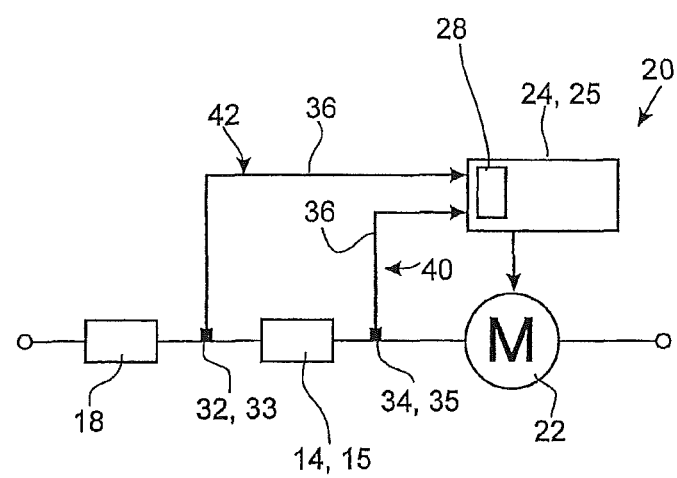
FIG. 2 is a schematic block diagram of a control device that is used in a vacuum cleaner.

FIG. 2 is a schematic of the control architecture, floor suction nozzle 18 and dust bag receptacle 14 being illustrated as rectangles and respectively symbolizing a flow resistance. The control device 20 comprises a control circuit 24, for example in the form of a microprocessor 25, which receives certain input signals via lines 36, evaluates them and outputs them to the motor 22 (or to a leading edge phase control) as power control signal.

The control device 20 comprises a pressure sensor 32 that is assigned to the floor suction nozzle 18, and measures the negative pressure prevailing in the floor suction nozzle 18. The pressure sensor 32 can be provided either in the region of the floor suction nozzle 18 or at the end of the hose 16 in the housing 12 of the floor vacuum cleaner.

The control device 20 has a further pressure sensor 34, which is arranged between dust bag receptacle 14 and motor 22 inside the housing 12.

Both sensors 32, 34 output their signals to the control circuit 24 via lines 36. Two control loops 40, 42 are constructed in this way, the first control loop 40 having the pressure sensor 34 and the control circuit 24, and the second control loop 42 having the pressure sensor 32 and the control circuit 24.

As already mentioned, the first control loop serves to maintain a constant air volume flow between dust bag receptacle 14 and motor 22, and the second control loop ensures that the pushing force does not overshoot a specific value.

It is to be remarked here that in the present exemplary embodiment the pushing force is not determined directly via a force sensor, but indirectly via the measurement of the negative pressure between floor and floor suction nozzle 18. Since a proportional relationship exists between pushing force and negative pressure, the required pushing force can be inferred via the detection of the negative pressure. The higher the negative pressure at the floor suction nozzle 18, the greater becomes the force to push or pull the floor suction nozzle over the floor.

In the present exemplary embodiment, the pressure sensor 32 is, moreover, designed as a pressure switch 33 that outputs a signal only upon overshooting of a prescribed negative pressure, such that it can be detected on the basis of the output signal solely whether the negative pressure lies below or above a prescribed value.

By contrast therewith, the pressure sensor is designed as an analog pressure sensor 35, it being possible to infer the flow rate of the air, and thus the air volume flow, via the measured pressure. A flow rate measurement sensor is therefore not required, but could certainly be provided as an alternative instead of the pressure sensor 34.

The activation of the first or the second control loop 40, 42 takes place via a control loop selection device 28 that is provided in the control circuit 24. Either the first control loop or the second control loop 40, 42 is activated, depending on the output signal of the pressure sensor 32.

As already explained above, the control loop selection device 28 activates the first control loop 40 when the negative pressure at the floor suction nozzle 18 lies below a prescribed value, and switches over to the second control loop 42 when the signal of the sensor 32, that is to say the negative pressure measured there, rises above a prescribed value.

The control device 20 consequently ensures that, on the one hand, the air volume flow is held constant even when the dust bag fills up slowly, and the flow resistance consequently rises. In this case, the control circuit 24 increases the power of the motor 22. In order, on the other hand, to prevent this control from leading to an excessive rise in the negative pressure at the floor suction nozzle 18, and thus the pushing force, in this case the second control loop is activated and again reduces the motor power until the negative pressure, and thus the pushing force, has undershot a maximum value.

It may further be pointed out at this juncture that the control circuit is designed such that stable control states are set up. The person skilled in the art is aware of the requisite measures, and so there is no need to go into the matter further.

Overall, it emerges that the advantages of the air volume flow control and the pushing force control are achieved with the aid of the inventive control device and the corresponding control method, without the need to accept the disadvantages of the individual methods.

What is claimed is:

1. An air volume flow and pushing force control device for a vacuum cleaner that has at least a motor, a dust receptacle and a suction nozzle, comprising:
   a controller for controlling the motor power;
   a first sensor, for detecting the air volume flow, which in conjunction with the controller forms a first control loop, such that when the first control loop is activated, the controller produces a motor control signal in accordance with a signal from the first sensor in order to maintain the air volume flow at a prescribed air volume flow value;
   a second sensor for detecting a pushing force that is required to push the suction nozzle and, in conjunction with the controller, forms a second control loop, such that when the second control loop is activated, the controller produces a motor control signal in accordance with a signal from the second sensor in order to maintain the pushing force below a prescribed value,
   wherein the second sensor is a force sensor that measures the pushing force action on the suction nozzle; and
   a control loop selection device that activates only one of the first and second control loops at a time as a function of the signals from the first and second sensors, such that said controller produces the motor control signal to control said motor power only in accordance with the signal from the sensor in the activated control loop.

2. The control device as claimed in claim 1, wherein the control loop selection device activates the second control loop when the signal supplied by the second sensor lies above a prescribed value, and otherwise activates the first control loop.

3. The control device as claimed in claim 1, wherein the first sensor is a pressure sensor.

4. The control device as claimed in claim 1, wherein the first sensor is a sensor for measuring the flow rate.

5. A method for controlling the air volume flow and the pushing force of a vacuum cleaner that has at least a motor, a dust receptacle and a suction nozzle, comprising the steps of:
   detecting the air volume flow between dust receptacle and motor;
   detecting the pushing force required to push the suction nozzle by detecting the negative pressure at the suction nozzle; and
   selectively controlling the power of the motor either (i) in accordance with the detected pushing force only when the detected pushing force is greater than a prescribed value, or (ii) otherwise in accordance with the detected air volume flow only to maintain a prescribed air flow.

6. The method as claimed in claim 5, wherein the pressure between dust receptacle and motor is detected in order to infer the air volume flow via said pressure.

* * * * *